Dec. 29, 1942.                J. F. MUSTEE                2,306,794
                          SNAP ACTION TOGGLE
                         Filed June 28, 1940
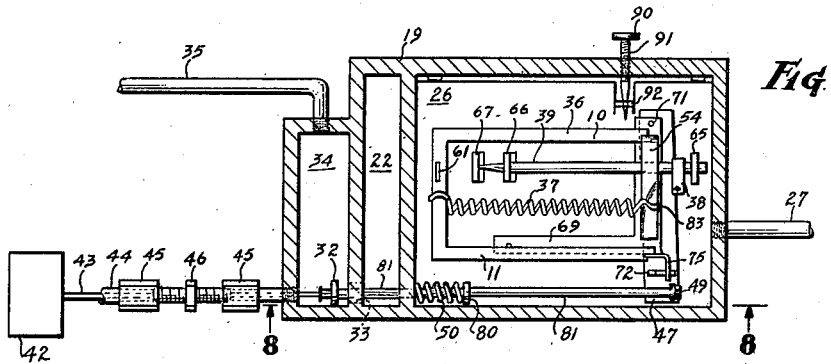
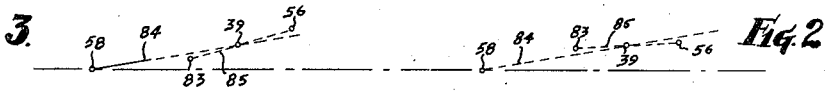
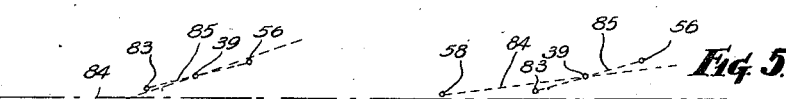
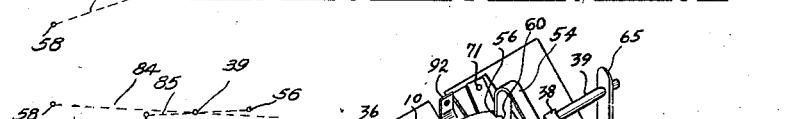
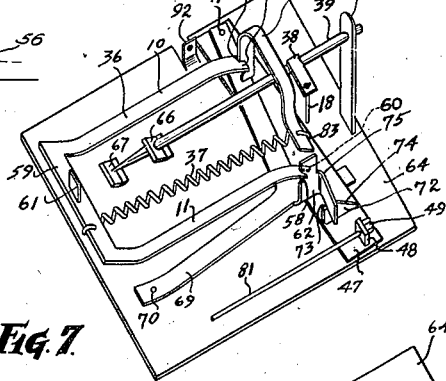
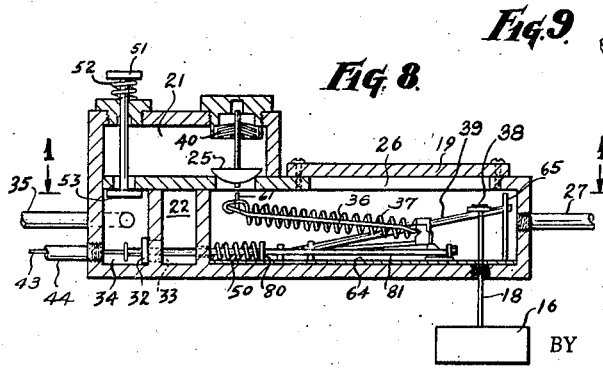
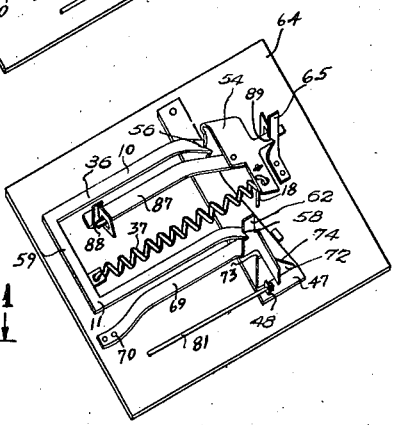
INVENTOR.
Joseph F. Mustee
BY
Woodling and Kroet.
ATTORNEY.

Patented Dec. 29, 1942

2,306,794

UNITED STATES PATENT OFFICE 2,306,794

SNAP ACTION TOGGLE

Joseph F. Mustee, Cleveland, Ohio

Original application July 25, 1939, Serial No. 286,391. Divided and this application June 28, 1940, Serial No. 342,993

17 Claims. (Cl. 74—97)

My invention relates to snap action toggles and more particularly to snap action toggles adapted to function in accordance with one or more existing conditions.

This application is a division of my application for Regulating devices, filed July 25, 1939, and bearing Serial No. 286,391 and corresponding reference characters represent like parts.

An object of my invention is to provide a snap action toggle or lever which functions in accordance with an external condition, such as the demand of a thermostat.

Another object of my invention is to provide a single snap action lever which may be governed by two conditions.

A further object of my invention is to provide a snap action lever which is normally biased in one direction and to provide for biasing the lever in the opposite direction in accordance with a plurality of conditions; each of said conditions resulting in the operation of the lever independently of the other conditions.

Still another object of my invention is to provide a snap action toggle which will regulate a controlled device such for example as a valve in accordance with a cyclic condition and which will prevent the controlled device from operating if an abnormal condition arises.

Another object of my invention is to provide a snap action toggle which will regulate, for example, the opening and closing of a valve in accordance with a plurality of cyclic conditions and which will prevent the valve from operating when an abnormal condition arises.

Another object of my invention is to provide a spring biased snap action lever for operating, for example, a valve and to pivotally mount the lever on two knife edges and to move these knife edges in accordance with a plurality of conditions to cause the biasing spring to snap the lever back and forth to actuate the valve.

Another object of my invention is to provide a snap action mechanism influenced by two cyclic conditions and an abnormal condition.

A further object of my invention is to provide a snap action mechanism which is adapted to operate, for example, a valve in accordance with two conditions and which will close the valve and keep it closed upon an emergency condition arising.

Other objects and a fuller understanding of my invention may be had by referring to the following description and claims, taken in conjunction with the accompanying drawing, in which:

Figure 1 of the drawing is a cross-sectional view of my device taken along line 1—1 of Figure 8 and showing a top view of the mechanism;

Figures 2, 3, 4, 5 and 6 are diagrammatic sketches showing the relative positions of important points of my invention through several operations;

Figure 7 is an isometric view of my snap action lever;

Figure 8 is a cross-sectional view of my device taken along line 8—8 of Figure 1 and showing a side view of my device: and Figure 9 is an isometric view of another embodiment of my invention showing a snap action lever which is mounted on knife edges.

My snap action toggle will be described in conjunction with a valve to regulate the flow of fluids in accordance with a condition or with a plurality of conditions, such for example, as regulating the flow of gas to a hot water heater in accordance with the temperature of the hot water storage tank. My snap action toggle is also adapted for controlling the valve to regulate the flow of the fluid in case an emergency or abnormal condition should arise, such for example, as stopping the flow of gas to a pilot burner and to the main burner when both the main burner and the pilot burner flames have been extinguished. It is to be understood that this application is not limited to hot water heaters as my snap action toggle has a wide variety of applications.

With reference to the drawing, my snap action mechanism may be mounted on a plate 64 within a casing 19. Inasmuch as this application is a division of my application Serial No. 286,391 and inasmuch as the present application is directed toward the snap action toggle mechanism, I have omitted showing the hot water heater and storage tank. Instead, the block diagram indicated by the reference character 16 represents generally the storage tank thermostatic device and the block diagram indicated by the reference character 42 represents the pilot burner thermostatic device. The valve casing 19 having the compartments 21, 26, 22 and 34, the pipes 27 and 35, the valve 25, the biasing spring 40, the push button valve 53, the spring 52 the push button 51, the pilot valve 32, the pilot valve opening 33, the cable 43, the tube 44, the adjusting nuts 45 and 46, the spring 50, and the spring stop 80 are the same as that described in my application Serial No. 286,391.

A rotatable shaft 39 is attached to the plate 64 by means of three supports 65, 66 and 67; the first support 65 being relatively high and adapted to journal one end of the rotatable shaft 39, the second support 66 being relatively low and adapted to journal the rotatable shaft 39 near its lower end, and the third support 67 being low and adapted to provide an end bearing for the rotatable shaft 39. A transverse arm 38 is welded or otherwise suitably attached to the rotatable shaft 39 and extends a slight distance to one side thereof. A condition responsive wire or member 18 is attached to the transverse arm 38 near the end farthest away from the rotatable shaft 39 whereby a pull on the wire 18 will cause the rotatable shaft to turn. The other end of the condition responsive wire 18 is connected to the condition responsive device 16 which may comprise a thermostatic element responsive to the temperature of heated water in a tank. The condition responsive device 16 is adapted to exert a tension stress on the wire and rotate the rotatable shaft 39. Across the rotatable axis 39 and welded thereto is a knife edge transverse bar 54, one end of which is downwardly turned and which has a notched bearing 56 on the downwardly turned portion. A substantially U-shaped lever 36 having two ends or legs 10 and 11 joined together by a cross bar 59 is positioned with the leg 10 against the notched bearing 56 and a spring 37 is attached to the knife edge transverse bar 54 and to the cross bar 59 to constrain the lever 36 toward the bearing 56. An upstanding leg member 62 having a notched bearing 58 therein is provided for the leg 11 of the lever 36 and is attached to the plate 64 in such a manner that it can be moved up-and-down with respect thereto in accordance with the second condition responsive device indicated generally by the reference character 42 and may comprise a thermostatic element responsive to the pilot burner. The end of the leg 11 of the U-shaped lever is adapted to be constrained toward the notched bearing 58 by means of the spring 37 and as the upstanding leg member 62 is moved up and down with respect to the plate 64 in accordance with a cyclic condition, the leg 11 of the lever 36 is moved up and down. The same spring 37 which constrains the lever 36 against the two bearings 56 and 58 is adapted to bias the entire lever in either of two positions. Ears 60 may be put on the knife edge bearings of legs 10 and 11 to keep the U-shaped lever 36 from slipping sideways off the notches 56 and 58. A projector 61 may be attached to the cross-bar 59 to contact the valve 25 as the lever 36 snaps back and forth. One of the two positions is adapted to hold the valve 25 open and the other of the two positions is adapted to cause the valve 25 to close against its seat. The position in which the lever is biased depends upon the relative positions of the first and second bearings 56 and 58 and upon the position of point where the spring 37 engages the knife edge transverse bar 54, the point being designated by the reference character 83. Figures 2, 3, 4, 5 and 6 illustrate the relative positions through which the bearing points 56 and 58 and the engagement point 83 move. These illustrations are made as though the observer were looking at Figure 1 from a point to the right thereof.

In Figures 2, 3, 4, 5 and 6, the point 83 is the point of connection between the spring 37 and the knife edge transverse bar 54. Point 56 is the knife edge bearing between leg 10 of lever 36 and the downwardly turned portion of the knife edge transverse bar 54 and line 85 is an imaginary line connecting the two points 83 and 56. Point 39 is the rotatable shaft about which the line 85 rotates under the influence of the first condition responsive device 16. Point 58 is the knife edge bearing between leg 11 of the lever 36 and the upstanding leg member 62 and is movable up and down with respect to the shaft 39 under the influence of the second condition responsive device 42. For the purpose of diagrammatically illustrating the relative movements, I have drawn an imaginary line 84 connecting bearing point 58 with the rotatable shaft 39. In practice 84 is a plane, inasmuch as 39 is a line and a line and a point define a plane. For the sake of clarity of description in Figures 2, 3, 4, 5 and 6, I show 84 as a line thereby reducing a three dimensional description to a two dimensional one. The dash-dot line is merely an arbitrary base to enable one to clearly see which of the points has been moved. To give a good snap action the point 83 where the spring 37 engages the knife edge transverse bar 54, is positioned to the rear or to the right of a line passing between the bearing points 56 and 58, see Figure 1.

Figure 2 illustrates my snap action device in a position wherein the spring 37 biases the lever 36 in a position which holds the valve 25 open and Figure 3 illustrates the device in a position wherein the spring 37 biases the lever 36 in a position which permits the spring 40 to close the valve 25. It will be seen that in Figure 2 the point 83 is above line 84 and the point 56 is below it whereas in Figure 3 the positions are reversed; point 83 being below and point 56 above. During the rotation of line 85 from its position in Figure 2 to its position in Figure 3 there was a point at which it coincided with line 84. This point of coincidence is the critical point and movement of either line 84 or 85 with respect to the other will cause immediate snap action of the lever 36. For example, if from the point of coincidence, line 84 or 85 should move to place point 83 above line 84 the spring 37 would bias the lever 36 to snap it in a direction to open the valve 25. This example is illustrated in Figure 2. For a further example, if from the point of coincidence, line 84 or 85 should move to place point 83 below line 84 the spring 37 would bias the lever 36 to snap it in a direction to enable the valve 25 to close. This is illustrated in Figure 3. As it is substantially impossible to make lines 84 and 85 coincide and stay that way for any period of time my device is substantially always in a position to bias the valve either open or closed.

The rotation of line 85 about the shaft 39 is in response to the first condition responsive device 16 turning the shaft 39 and is independent of the movement of point 58. The movement of point 58 is independent of the movement of line 85 and causes movement of the imaginary line 84 in response to the second condition responsive device 42. Figure 4 illustrates the positions of the various points after movement of the point 58 pulled down under the influence of the second condition responsive device 42 has caused line 84 to fall below point 83 thereby snapping the lever 36 to permit opening of the valve 25. This opening is effected even though line 85 is in the position which would normally allow valve 25 to close. Upon the second condition responsive device 42 being satisfied the point 58 moves to cause the lines 84 and 85 to pass through the critical point and snap the valve 25 closed. The relative positions for this condition are illustrated in Figure 5. It will therefore be seen that the opening and closing of the valve 25 is effected in accordance with two conditions; namely, 16 and 42, and that each of the conditions governs the closing or opening of the valve substantially independently of the other condition. Further, it will be seen that the two conditions may act together to regulate the valve, such for example, one condition may tend to open the valve while the other tends to close it. In this situation the condition which needs satisfaction most will prevail.

Figure 6 diagrammatically illustrates a safety feature which is inherent in my snap action device. In case the first condition gets to a point where it would be undesirable for the other condition to operate the valve I provide for the first condition to block out the second. That is, upon an emergency arising in the first condition, I provide for closing the valve and for keeping it closed no matter what the desire of the second condition. This is effected by raising the point 58 to a height above the highest point to which point 83 can go. It therefore becomes impossible for line 85 to pass the critical point and the valve 25 remains closed until manual attention is given it to remedy the emergency condition. The emergency closing of valve 25 may be effected to prevent the opening of the valve upon an emergency arising in the second condition by causing the point 83 to go below the lowest point to which the line 84 can go. This prevents movement of line 84 from opening the valve 25 until manual adjustment of the emergency condition has been made.

The mechanism for causing the bearing 58 to move up and down in accordance with a cyclic condition governed by the second condition responsive device 42 comprises a pivotal arm 47 which is pivotally attached to the plate 64 by means of a rivet or other device 71. Attached to the pivotal arm 47 at the end opposite the rivet 71 is a positioning lug 72 having a flat top surface 73 and an inclined face 74. The positioning lug 72 is positioned under and adapted to engage an arm 75 which is integral with the upstanding leg member 62 and an L-shaped member 69. The ends of the L-shaped member 69 are attached at 70 and 71 to the base plate 64 by means of rivets or other devices. The arm 75 carried by the L-shaped member 69 is adapted to be biased against the face 74 of the lug 72 by the resiliency of the L-shaped member. Movement of the pivotal arm 47 causes the arm 75 to move up and down the inclined face 74 of the positioning lug 72 thereby raising and lowering the bearing 58. Attached to the pivotal arm 47 is an upstanding lip 48 and connected to the lip 48 by means of a nut 49 is a stiff rod 81 actuated by the condition responsive device 42 through the cable 43 and the adjusting nuts 45 and 46. The spring 50 biases the rod 81 in opposition to the condition responsive device 42. In the above described manner, I cause both the condition responsive devices 16 and 42 to actuate the single lever 36 which in turn controls the valve 25.

Figure 9 is another embodiment of my invention showing the plate 64 upon which the mechanism is mounted. The pilot thermostat actuating means as shown in this view is the same as that shown in Figure 7. In this embodiment of my invention I use a knife edge rotatable shaft 87 instead of the bearinged rotatable shaft 39. This reduces friction in the device. The knife edge rotatable shaft 87 is suspended by notched legs at 88 and 89 and the action is similar to the action of the bearinged rotatable shaft 39.

To provide an adjustment for my device I have arranged for a turnable knob 90 to be mounted on and project through the device casing 19. A long tapered shaft 91 is attached to the knob. An upturned lip 92 is provided in the base plate 64 and the tapered shaft 91 is adapted to thrust between the base plate 64 and the casing of the device at the point where the lip 92 is turned. This action will raise or lower the plate with respect to the casing thereby adjusting the point at which the lever 36 snaps back and forth.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A snap action toggle comprising, in combination, a substantially U-shaped lever having a first and a second end, a first bearing for said first end, a second bearing for said second end, resilient means attached to said lever to urge it toward said bearings, means to move said first bearing to actuate said lever and means to move said second bearing to actuate said lever.

2. A snap action toggle comprising, in combination, a substantially U-shaped lever having a first and a second end, a first bearing for said first end, a second bearing for said second end, resilient means for urging said lever toward said bearings and for biasing said lever in one direction, means responsive to a first condition for moving one of said bearings to cause said lever to snap in another direction and means responsive to a second condition for moving said second bearing to prevent said lever from snapping in said other direction.

3. A snap action toggle comprising, in combination, a substantially U-shaped lever having a first and a second end, a revolvable shaft between said first and said second end, a transverse bar attached to and extending across said revolvable shaft, said transverse bar having a first bearing means for engaging the said first end of the U-shaped lever, a second bearing means for engaging the said second end of the U-shaped lever, resilient means for urging the U-shaped lever toward the said bearing means and for biasing said lever in a first and a second position, means for revolving said shaft in a first direction to snap said lever into said first position and for revolving said shaft in a second direction to snap said lever into said second position, and means for moving said second bearing means to prevent the rotation of the shaft from causing the lever to snap.

4. A snap action toggle comprising, in combination, a lever, first bearing means for said lever, second bearing means for said lever, resilient means for constraining said lever toward said bearing means, means for moving said first bearing in one direction to cause said lever to snap in one direction and for moving said first bearing means in another direction to cause said lever to snap in another direction, and means for moving said second bearing means to prevent said lever from snapping upon movement of said first bearing means.

5. A snap action toggle comprising, in combination, a substantially U-shaped lever having two ends, first bearing means for the first of said two ends and second bearing means for the second of said two ends, spring means engaging said lever and engaging one of said bearing means for holding said lever against said bearing means, said first and said second bearing means establishing a line and the engagement between the spring means and the bearing means establishing a point on one side of said line, means responsive to a first condition for altering the relative positions of the line and the point to cause said lever to snap and means responsive to a second condition for altering the position of the line with respect to the point to prevent the said lever from snapping.

6. A snap action toggle comprising, in combination, a substantially U-shaped snap action lever mechanism movable in two opposite directions and having two ends, a bearing for each of said ends, a spring for normally biasing said lever in one of said directions, means responsive to a first condition for overcoming said bias and causing said lever to snap to said other position, and means responsive to a second condition for moving at least one of said bearings relative to the other to modify the snap-action of the U-shaped lever.

7. A snap action lever comprising, in combination, a spring, a pivotal member, a bar attached transversely across said member and having a first knife edge at one end and means at the other end for attaching one end of said spring, a second knife edge on the other side of said member from said first knife edge and a substantially U-shaped lever attached to the other end of the spring and biased by the spring against the first and second knife edges, said second knife edge and said member forming a plane and said first knife edge and the point on the transverse bar at which the spring attaches forming a line which is rotatable about said member and through said plane, the point at which the line coincides with the plane being a critical point above or below which the said spring snaps the lever to a first position or to a second position, first condition responsive means for rotating said line about said member to snap said lever and second condition responsive means for altering the location of the said plane to change the value of the condition at which the said line will pass through the said critical point and cause said lever to snap.

8. A snap action lever comprising, in combination, a lever mechanism including a spring biased snap action lever having two pivoted ends and movable in two opposite directions, first means for moving one of said pivoted ends to cause snap action in said two opposite directions and second means structurally independent of the first means for moving the other of said pivoted ends to cause snap action in said two opposite directions.

9. A snap action lever comprising, in combination, snap action means including a movable point and a reference point and an adjustable point, said reference point and said adjustable point defining a critical line, means for moving said movable point to cause it to pass said critical line thereby causing said snap action means to snap, means for adjusting said adjustable point to alter the position of the said critical line to change the location at which said movable point will pass the critical line.

10. A snap action lever comprising, in combination, a lever, a rotatable member mounted on knife edges and having a knife edge connection with said lever, means for rotating said lever about said member to cause said lever to snap and means having a knife edge connection with said lever to alter the snapping of said lever as said lever rotates about said member.

11. A snap action toggle comprising, in combination, a substantially U-shaped lever having a first and a second end, a first bearing for said first end, a second bearing for said second end, resilient means attached to said lever to urge it toward said bearings, means to move said first bearing to actuate said lever, means to move said second bearing to actuate said lever and to move said second bearing to prevent said first means from actuating said lever.

12. A snap action toggle comprising, in combination, a lever, first bearing means for said lever, second bearing means for said lever, means for urging said lever toward said bearing means, means for moving one of said bearings to cause said lever to snap under the influence of the urging means, means for moving the second of said bearing means within a limited distance to cause said lever to snap under the influence of the urging means, and means to move the second bearing means farther than the said limited distance to prevent the movement of the first bearing means from causing the lever to snap.

13. A snap action toggle comprising, in combination, a substantially U-shaped lever having two ends, a first bearing for said first end, a second bearing for said second end, resilient means attached to said lever to urge it toward said bearings and means to move said bearings relative to each other.

14. A snap-action toggle comprising, in combination, a snap-action lever means having a first and a second end portion spaced from each other, a first bearing for said first end portion, a second bearing for said second end portion, resilient means attached to said lever means to urge it toward said bearings, the snap-movement of said lever means being effected by shifting the relationship between the first bearing and the resilient means, means to shift said relationship for effecting snap-movement of said lever means, and means to move said second bearing to prevent the said shifting from effecting snap-movement of said lever means.

15. A snap-action toggle comprising, in combination, a snap-action lever means having a first and a second end portion spaced from each other, a first bearing for said first end portion, a second bearing for said second end portion, resilient means attached to said lever means to urge it toward said bearings, the snap-movement of said lever means being effected by shifting the relationship between the first bearing and the resilient means, means to shift said relationship for effecting snap-movement of said lever means, and means to move said second bearing to alter the effect that the shifting means has upon the said lever means.

16. A snap-action toggle comprising, in combination, a snap-action lever means having a first and a second end portion spaced from each other, a first bearing for said first end portion, a second bearing for said second end portion, resilient means attached to said lever means to urge it toward said bearings, means to actuate the first bearing and the resilient means for effecting snap-movement of said lever means, and means to move said second bearing to alter the effect that the actuating means has upon the said lever means.

17. A snap action toggle comprising, in combination, a substantially U-shaped lever having two ends, a first bearing for said first end, a second bearing for said second end, resilient means having two ends, means for connecting one of said ends of the resilient means to the U-shaped lever, actuating means engaging the other of said ends of the resilient means to operate the U-shaped lever with a snap-action about the two bearings, and means to move at least one of said bearings relative to the other to modify the action of the resilient means on the U-shaped lever.

JOSEPH F. MUSTEE.